United States Patent
Hershey

(10) Patent No.: US 11,274,270 B2
(45) Date of Patent: Mar. 15, 2022

(54) CLEANING COMPOSITIONS WITH PH INDICATORS AND METHODS OF USE

(71) Applicant: Alpha Chemical Services, Inc., Stoughton, MA (US)

(72) Inventor: Noah Hershey, Arlington, MA (US)

(73) Assignee: Alpha Chemical Services, Inc., Stoughton, MA (US)

(*) Notice: Subject to any disclaimer, the term of this patent is extended or adjusted under 35 U.S.C. 154(b) by 214 days.

(21) Appl. No.: 15/698,083

(22) Filed: Sep. 7, 2017

(65) Prior Publication Data

US 2018/0291315 A1   Oct. 11, 2018

Related U.S. Application Data

(60) Provisional application No. 62/532,501, filed on Jul. 14, 2017, provisional application No. 62/482,818, filed on Apr. 7, 2017.

(51) Int. Cl.

| | | |
|---|---|---|
| *C11D 11/00* | (2006.01) | |
| *C11D 3/34* | (2006.01) | |
| *C11D 3/40* | (2006.01) | |
| *C11D 3/20* | (2006.01) | |
| *C11D 3/04* | (2006.01) | |
| *C11D 3/36* | (2006.01) | |
| *B08B 9/032* | (2006.01) | |
| *B67D 1/07* | (2006.01) | |
| *A23L 5/20* | (2016.01) | |
| *B08B 9/08* | (2006.01) | |
| *C11D 3/00* | (2006.01) | |
| *B08B 9/027* | (2006.01) | |

(52) U.S. Cl.
CPC .......... *C11D 11/0041* (2013.01); *A23L 5/20* (2016.08); *B08B 9/032* (2013.01); *B08B 9/08* (2013.01); *B67D 1/07* (2013.01); *C11D 3/0042* (2013.01); *C11D 3/044* (2013.01); *C11D 3/2086* (2013.01); *C11D 3/3409* (2013.01); *C11D 3/364* (2013.01); *C11D 3/40* (2013.01); *C11D 11/0064* (2013.01); *A23V 2002/00* (2013.01); *B08B 9/027* (2013.01); *B67D 2001/075* (2013.01)

(58) Field of Classification Search
None
See application file for complete search history.

(56) References Cited

U.S. PATENT DOCUMENTS

| | | |
|---|---|---|
| 2,502,881 A | 4/1950 | Parker |
| 2,998,306 A | 8/1961 | Huyck et al. |
| 3,042,621 A | 7/1962 | Kirschenbauer |
| 3,355,392 A | 11/1967 | Cantor et al. |
| 3,705,856 A | 12/1972 | Sedliar et al. |
| 4,971,631 A | 11/1990 | Sallee et al. |
| 5,929,004 A | 7/1999 | Ushijima et al. |
| 6,686,325 B2 | 2/2004 | Hoyt et al. |
| 7,501,027 B2 | 3/2009 | Ahmed et al. |
| 7,737,101 B2 | 6/2010 | Thonhauser et al. |
| 7,863,233 B2 | 1/2011 | Thonhauser |
| 2007/0207941 A1 | 9/2007 | Thonhauser |
| 2011/0197920 A1* | 8/2011 | Kenowski ............... B08B 9/027 134/10 |
| 2012/0093689 A1 | 4/2012 | Thonhauser et al. |

OTHER PUBLICATIONS

Products, Thonhauser. Retrieved from the Internet on Jul. 28, 2018. <<http://www.thonhauser.net/en-us/products/>>.
TM Desana Liquid—Tech sheet for liquid application, <<www.desana-usa.com, www.thonhauser.net>>.
TM Smart Add IC—Tech Sheet for liquid additive application, <<www.thonhauser.net>>.
TM Desana Max IC—Tech Sheet for powder application, <<www.thonhauser.net>>.
Thonhauser Distributor Map. Retrieved from the internet on Jul. 30, 2018. <<http://www.thonhauser.net/en/company/worldwide-partners/>>.
Thonhauser References. Retrieved from the Internet on Jul. 30, 2018. <<http://www.thonhauser.net/en-us/references/>>.
Clear-Tap Beer Line Cleaner—Alkaline based line cleaner with a colored rinse indicator. Retrieved from the Internet on Jul. 30, 2018. <<https://nationalchemicals.com/clear_tap_beer_line_cleaner-135-information.html>>.
AllKlear Rinse Indicator—Indicator additive via tablet. Retrieved from the Internet on Jul. 30, 2018. <<https://nationalchemicals.com/allklear_rinse_indicator-142-information.html>>.

\* cited by examiner

*Primary Examiner* — Eric W Golightly
(74) *Attorney, Agent, or Firm* — Elmore Patent Law Group, P.C.; Joseph Zucchero; Carolyn Elmore

(57) ABSTRACT

The present invention provides acidic or basic cleaning compositions for use in cleaning food and beverage industry processing equipment and pharmaceutical and cosmetic industry processing equipment wherein the compositions of the invention comprise a food-equipment-safe acidic or basic cleaning compound and a food-equipment-safe colorimetric indicator of pH to show the desired acid or basic conditions during storage prior to the start of a cleaning cycle and after storage and during a cleaning cycle. The cleaning compositions of the invention are particularly useful in, for example, CIP cleaning processes.

8 Claims, No Drawings

CLEANING COMPOSITIONS WITH PH INDICATORS AND METHODS OF USE

RELATED APPLICATION

This application claims the benefit of U.S. Provisional Application No. 62/482,818, filed Apr. 7, 2017 and U.S. Provisional Application No. 62/532,501, filed on Jul. 14, 2017. The entire teachings of the above applications are incorporated herein by reference.

BACKGROUND OF THE INVENTION

Cleaning-in-Place (CIP) is now a very common practice in the food and beverage industries and pharmaceutical and cosmetic industries replacing manual strip down, cleaning and rebuilding of process systems used in these industries. The primary commercial advantage is a substantial reduction in the time that the plant is out of production and the ability to utilize more aggressive cleaning chemicals in a contained environment which cannot be safely handled with manual cleaning.

Cleaning-in-place, or CIP, refers to all those mechanical and chemical systems that are necessary to prepare equipment for e.g. food processing, either after a processing run that has produced normal fouling or when switching a processing line from one recipe to another. Cleaning in place means that cleaning takes place without dismantling the system. CIP is an important component in guaranteeing e.g. food safety in food processing plants. Successful cleaning between production runs avoids potential contamination and products that don't meet quality standards.

Carrying out CIP correctly ensures secure barriers between food flows and cleaning chemical flows. It is also important that CIP is carried out effectively and efficiently. Any cleaning time is downtime—the equipment is not productive. Cleaning must also be carried out safely, because very strong chemicals are involved that can be harmful to people and to equipment. Finally, it should be carried out with the least impact on the environment by using minimal amounts of water and detergents and by maximizing the re-use of resources.

It is a continuing goal to increase the efficiency of cleaning CIP systems. One area of improvement is monitoring the effectiveness of cleaning agents used in CIP systems during storage prior to deployment in the CIP cleaning process and in real time during the CIP process.

SUMMARY OF THE INVENTION

The present invention provides acidic or basic cleaning compositions for use in cleaning food and beverage industry processing equipment and pharmaceutical and cosmetic industry processing equipment wherein the compositions of the invention comprise a food-equipment-safe acidic or basic cleaning compound and a food-equipment-safe colorimetric indicator of pH to show the desired acid or basic conditions during storage prior to the start of a cleaning cycle and after storage and during a cleaning cycle. The cleaning compositions of the invention are particularly useful in, for example, CIP cleaning processes. The present invention therefore provides CIP cleaning compositions for use in cleaning food and beverage industry processing equipment and pharmaceutical and cosmetic industry processing equipment comprising a food-equipment-safe acidic or basic cleaning compound and a food-equipment-safe colorimetric indicator of pH to show the desired acid or basic conditions during storage prior to the start of CIP cleaning cycle and after storage and during CIP cleaning cycle. The invention also provides methods of maintaining desired acid or basic conditions of the cleaning composition during storage of the CIP cleaning composition and after storage and during the CIP cleaning process by monitoring the food-equipment-safe colorimetric indication of pH to for the desired acidic or basic conditions prior to the start CIP cleaning cycle or during the CIP process and optionally adjusting the CIP system to revert to the desired acidic or basic conditions. The acidic or basic cleaning compositions of the invention are also suitable for cleaning processing equipment in the food and beverage industry and in the pharmaceutical and cosmetic industry that do not require CIP cleaning systems or processes.

DETAILED DESCRIPTION OF THE INVENTION

As used herein, the term "Clean-in-Place" or "CIP" refers to industrial methods, systems and equipment for cleaning the interior surfaces of processing vessels, pipes, and associated hardware, without the necessity of disassembling the equipment. CIP is frequently used in processing plants to clean pipes, storage tanks, workspaces and conveyance systems between production cycles of different food stuffs and products. Industries and equipment that utilize Clean-in-Place (CIP) technologies include those that require frequent and high quality of cleaning and sanitation, such as: brewing, dairy, pharmaceutical, beverage, processed foods, and cosmetics. CIP systems are designed to fit the specific needs of the equipment and may utilize high pressure turbulent gas flow, high flow-rate solvent, reverse flow valves, high pressure or energy spray, high or elevated temperature, application of chemical detergents and filtration sampling systems and sensors. CIP systems include those that comprise storage tanks for holding CIP cleaning compositions including cleaning solutions.

As used herein, the term "food and beverage industry" refers to industrial and agricultural activities in which food and beverages are prepared, processed and stored, and includes meat and poultry plants, wineries, breweries, beverage manufacturing facilities, dairy farms, swine farms, poultry and turkey farms, farm premises, hatcheries, refrigerated trucks, restaurants, bars, cafeterias, institutional kitchens, convenience stores food preparation areas, food storage areas and food service areas.

As used herein the term "pharmaceutical and cosmetic industry" refers to activities related to the research, development and manufacturing of drugs and biologicals for human or veterinary use or activities related to the research, development and manufacturing or cosmetics for use on the human body intended for cleansing and beautifying.

As used herein the term "food-equipment-safe" when describing any component of a CIP cleaning composition of the invention including an acidic or basic cleaning compound or detergent or a colorimetric pH indicator means a pH indicator that is suitable for use in the combined food and beverage industries and in the pharmaceutical and cosmetic industries.

"Food soil" is generally defined as unwanted matter on food-contact surfaces. Soil is visible or invisible. The primary source of food soil is from the food product being handled. However, minerals from water residue and residues form cleaning compounds contribute to films left on surfaces. Microbiological biofilms also contribute to soil buildup on surfaces.

"Cleaning" means to perform or aid in soil removal, bleaching, microbial population reduction, rinsing, or combination thereof.

The terms "cleaning reagents", "cleaning solutions", "cleaning detergents", "cleaning compounds" and "CIP cleaning compositions" are used interchangeably herein and refer to the cleaning compounds used in a CIP cleaning system process or cycle which is usually a mixture of cleaning compounds that interact with food soils on or more ways.

The term "surfactant" or "surface active agent" refers to an organic chemical that when added to a liquid changes the properties of that liquid at a surface. Cleaning compositions in accordance with the invention may comprise about 0.01 to about 3 wt-%, about 0.05 to about 2 wt-%, or about 0.1 to about 0.5 wt-% of surfactants. The surfactant may be a combination of surfactants including nonionic, anionic and cationic surfactants.

A weight percent (wt %) of a component, unless specifically stated to the contrary, is based on the total weight of the formulation or composition in which the component is included.

One exemplary type of CIP system comprises a batch tank in which cleaning and/or rinse solutions may be held during the cleaning cycle. The batch tank provides a container for mixing the detergent into the water to be circulated through the various portions of the CIP system during the cleaning cycle. After completing a circuit through the equipment, the solutions are typically returned to the tank to await further circulation. Another type of CIP system foregoes the batch tank and instead utilizes apparatus for adding detergent in-line as the cleaning solution circulates through the processing equipment. The cleaning and rinsing solutions may circulate through the CIP system as substantially continuous streams, or as discrete slugs of solution separated by pockets of air.

Conventional CIP (clean-in-place) processes are generally well known. The process includes applying or circulating a water diluted solution of cleaning concentrate (typically about 0.5-3% by volume) onto the surface to be cleaned. The solution flows across the surface (3 to 6 feet/second) to remove the soil. Either new solution is re-applied to the surface, or the same solution is re-circulated and re-applied to the surface as required to achieve a clean soil-free surface.

A typical CIP process to remove a soil (including organic, inorganic or a mixture of the two components) often includes at least three steps also referred to herein as a "cleaning cycle": an initial water rinse or previously used chemical rinse, an alkaline and/or acid cleaning solution wash, and a final fresh water rinse. Additional steps may include a separate acid or alkaline wash as well as a separate sanitizing step. The alkaline solution softens the soils and removes the organic alkaline soluble soils. The acid solution removes any remaining mineral soils. The strength of the alkaline and acid solutions, the duration of the cleaning steps and the cleaning solution temperature are typically dependent on the amount and tenacity of the soil. The water rinse removes any residual chemical solution and soils prior to the equipment being returned on-line for production purposes.

The pH of the cleaning compositions can be adjusted based on the choice of acid cleaning or alkaline cleaning for various food soil types. The pH of a cleaning reagent solution can be adjusted by adding additional base or acid throughout the process to maintain its basic or acidic pH. If a basic cleaning composition is used, the pH may be more than about 7, more than about 8, more than about 9, more than about 10, or about 12 or more. If an acidic cleaning composition is used, the pH may be less than about 7, less than about 6.5, less than about 6, less than about 5.5, less than about 5, less than about 4, less than about 3.5, less than about 2.5 or less than about 1.5. Preferred acidic cleaning compositions of the invention have a pH of less than about 2.0. Preferred basic cleaning compositions have a pH of more than about 12.

It is important to regularly monitor the concentration and effectiveness of cleaning reagents used in CIP storage tanks using for example pH testing and/or conductivity meters upon agent recovery. Cleaning solutions used for CIP gradually lose strength during storage or due to dilution with residual rinse water and through the cleaning action itself during a cleaning cycle. Conductivity can often be used to monitor the strength of the cleaning solutions to indicate the need for replenishment. In the past, this has been done by an in-line probe, a hand-held meter or regular laboratory analysis to ensure that the cleaning reagent is effective (e.g., maintaining acidic conditions for cleaning) and also insuring that the reagent is not being overdosed in the system. However, there are disadvantages to these methods as they require sensors (probes) that must be brought into contact with the caustic or acidic conditions of the CIP process and thereby corrode or may introduce contamination. Hand held meters have the same drawbacks and laboratory methods can generally not be accomplished in real time with the CIP process. While some CIP systems rely on conductivity transmitters for concentration measurement of CIP cleaning compositions, some systems users prefer to use pH where accuracy is better but additional labor to calibrate and maintain is hard to justify.

The present invention provides cleaning compositions and preferably cleaning compositions suitable for CIP systems and processes that comprise an acidic or basic cleaning composition and a food-equipment safe pH color indicator that provides an instant visual reading of the pH conditions in the storage tanks in which a cleaning composition of the invention is stored or during the CIP process. The ability to instantly visualize acidic or basic conditions of cleaning compositions used in a CIP system while stored in the tanks prior to CIP processes enables quick and efficient adjustment of the pH of the cleaning composition to restore it to acid (preferably a pH of about 2.0 or less) or basic conditions (preferably a pH of 12.00 or more) for optimum CIP cleaning during the process for example by adding acid or base to the system or replenishing the cleaning composition. The effectiveness of the cleaning composition once it has been deployed from the storage tank into the CIP cycle for cleaning can also be achieved in the same manner.

The cleaning composition of the invention and particularly those cleaning compositions that are useful in CIP systems, may be provided as a concentrated cleaning solution to be mixed with water or a ready to use diluted solution. If the composition is concentrated the colorimetric pH indicator maintains a readily visualized color upon dilution of the concentrated cleaning solution in water. The color indicator does not separate from the cleaning composition while stored even in high pH environment or in a low pH environment. All components of the CIP cleaning compositions of the invention are food-equipment-safe.

Preferably, an alkaline cleaning composition of the invention in diluted form comprises about 1% to 60% by weight, preferably about 1%-50% by weight, preferably about 1%-25% by weight, preferably about 1%-15% by weight, preferably about 1%-10% by weight and preferably about 1% to about 5% by weight of a highly alkaline detergent such as sodium hydroxide, or potassium hydroxide, or a moderately alkaline detergent in combination with about 0.01 to about 10% percentage by weight, preferably about 0.01 to about 8% percentage by weight, preferably about 0.01 to about 5% percentage by weight, preferably about 0.01 to about 4% percentage by weight, preferably about 0.01 to about 3% percentage by weight, preferably about 0.01 to about 2% percentage by weight and preferably about 0.01 to about 1% percentage by weight of a food-equipment-safe colorimetric pH indicator. The balance of the composition may be made up of water or other additives including surfactants, water conditioners, oxidizing agents, enzyme ingredients, corrosion inhibitors, glycol ethers to (improve oil, grease and carbon removal). Other alkaline detergents include any alkaline components typically used in cleaning compositions, including triethanol amine (TEA), diethanol amine (DEA), monoethanolamine (MEA), carbonates, bicarbonates, percarbonates, sesquicarbonates, morpholine, sodium metasilicate, potassium silicate, etc.

Preferably, an acidic cleaning composition of the in diluted form comprises about 1% to 60% by weight, preferably about 1%-50% by weight, preferably about 1%-25% by weight, preferably about 1%-15% by weight, preferably about 1%-10% by weight and preferably about 1% to about 5% by weight of an acid detergent which may include organic and inorganic acids in combination with about 0.01 to about 10% percentage by weight, preferably about 0.01 to about 8% percentage by weight, preferably about 0.01 to about 5% percentage by weight, preferably about 0.01 to about 4% percentage by weight, preferably about 0.01 to about 3% percentage by weight, preferably about 0.01 to about 2% percentage by weight and preferably about 0.01 to about 1% percentage by weight of a food-equipment-safe colorimetric pH indicator. The most common inorganic acids used as food-equipment safe acid detergents include phosphoric, nitric, sulfamic, sodium acid sulfate, and hydrochloric. Organic acids, such as hydroxyacetic, citric, tartaric, lactic, malic, and gluconic, are also in use. Acid detergents are often used in a two-step sequential cleaning regime with alkaline detergents. Acid detergents are also used for the prevention or removal of stone films (mineral stone, beer stone, or milk stone), by weight of a suitable colorimetric pH indicator. The balance of the composition may be made up of water and other additives including surfactants, water conditioners, oxidizing agents, enzyme ingredients, corrosion inhibitors, glycol ethers to (improve oil, grease and carbon removal).

Preferred food-equipment-safe colorimetric pH indicators are Thymol Blue and and Indigo Carmine. Other preferred pH indicators include but are not limited to methyl orange, methyl red, bromothymol blue, phenolphtalien and alizarin yellow. Preferred food-equipment-safe—pH indicators used in the cleaning compositions of the invention and preferably CIP cleaning compositions are suitable for use in making pH measurements of pH which are precise to about 0.2 or 0.3 units. Table 1 provides the properties of selected pH indicators suitable for use with the cleaning compositions of the invention.

TABLE 1

| Name | pK$_a$ | Effective pH range | Color Acid form | Basic form |
|---|---|---|---|---|
| Thymol blue | 1.6 | 1.2-2.8 | Red | Yellow |
| Indigo carmine | 12.2 | 11.4-13.0 | Blue | Yellow |
| Methyl orange | 4.2 | 3.1-4.4 | Red | Orange |
| Methyl red | 5.0 | 4.2-6.2 | Red | Yellow |
| Bromothymol blue | 7.1 | 6.0-7.8 | Yellow | Blue |
| Phenolphthalein | 9.5 | 8.3-10.0 | Colorless | Red |
| Alizarin yellow | 11.0 | 10.1-12.4 | Yellow | Red |

One preferred acidic cleaning composition of the invention comprises about 79.47% by weight water, about 20% by weight of methane sulfonic acid, about 0.5% by weight of surfactant such as a $C_6$-$C_{10}$ ethoxylated, propoxylated alcohols, and about 0.03% by weight of thymol blue. This cleaning composition is particularly suitable for all CIP systems in need of an acidic cleaning composition.

One preferred basic cleaning composition of the invention comprises (i) about 53.29% by weight of water, (ii) about 1.1% by weight of an aqueous solution comprising pentasodium salt of aminotri(methylenephosphonic acid) at a concentration of 38-42% by weight and sodium phosphite at a concentration of about 0-0.1% by weight, (iii) about 45% caustic soda also referred to herein as sodium hydroxide (50% solution), (iv) about 0.6% sodium gluconate; and (v) about 3.4% thymol blue dye. The aqueous solution is also known to those skilled in the art as MAYOQUEST 1400 available from Compass Chemical International LLC, Smyrna Ga.

Basic cleaning compositions of the invention are particularly useful for use in CIP systems as well being useful for cleaning equipment in all steps of beer brewing. The beer brewing systems that may be cleaned using this composition are not necessarily CIP cleaning systems although this basic formulation is also suitable for use in all CIP cleaning systems. Therefore, the invention provides a method of cleaning beer brewing processing equipment comprising contacting the beer brewing equipment with a basic cleaning composition of the invention and preferably a basic cleaning composition comprising (i) about 53.29% by weight of water, (ii) about 1.1% by weight of an aqueous solution comprising pentasodium salt of aminotri(methylenephosphonic acid) at a concentration of 38-42% by weight and sodium phosphite at a concentration of about 0-0.1% by weight, (iii) about 45% caustic soda also referred to herein as sodium hydroxide (50% solution), (iv) about 0.6% sodium gluconate; and (v) about 3.4% thymol blue dye.

The present cleaning compositions are readily made by simple mixing methods from readily available components which, on storage, do not adversely affect the entire composition.

The present invention also provides methods of using the cleaning compositions of the invention comprising a pH indicator in accordance with the invention for maintaining acidic or basic cleaning conditions in a CIP cleaning process comprising the steps of:

i) Adding an acidic or basic cleaning composition comprising a food equipment safe pH indicator in accordance with the invention to a storage tank of a CIP system wherein the pH indicator imparts a first color to the composition that indicates the desired acidic or basic conditions;

ii) Observing the color of the acidic or basic cleaning composition in the storage tank prior to deploying the cleaning composition in the CIP cleaning cycle wherein a change in the first color of the cleaning composition indicates that the desired acidic or basic conditions are no longer present;

iii) Optionally adjusting the acidity or basicity of the cleaning composition in the storage tank to restore the desired acidic or basic conditions as indicated by the first color prior to deploying the cleaning composition to the cleaning cycle;

iv) Optionally deploying the cleaning composition to the CIP cleaning cycle;

v) Optionally observing the color of the cleaning composition after it is deployed into the CIP cleaning cycle wherein a change in the first color of the cleaning composition indicates that the desired acidic or basic conditions are no longer present; and vi) Optionally adjusting the CIP cleaning cycle to the desired acidic or basic conditions as indicated by the first color.

Preferably adjusting the CIP cleaning cycle to the desired acidic or basic conditions comprises the steps of adding acid or base as is appropriate or replenishing the cleaning composition of the invention to the system.

Preferably, the CIP cleaning equipment used in conjunction with the cleaning compositions of the invention allow for visualization of cleaning compositions of the invention while present in the storage tank or while being used during the CIP cleaning cycle without the need to stop the CIP cleaning cycle or open the system and expose it to the environment. The cleaning composition storage tanks of the CIP system or portions thereof may be constructed with clear materials such as glass or plastic to provide, for example a sight glass, such that the color of the cleaning composition as held in the tank is visible. Also, lines running to and from the equipment being cleaned in the CIP process may include portions with clear windows into the various lines leading to and from the equipment being cleaned via the CIP process in order to visualize the color.

EXAMPLES

Example 1: Use of an Acidic Cleaning Composition of the Invention to Clean Beer Brewing Equipment A cleaning composition of Formula 1 comprising:
Formula 1:
Water: 79.47% by weight
Lutropur MSA: 20% by weight
SCF-18: 0.5% by weight
Thymol Blue: 0.03% by weight
was prepared by mixing of the ingredients in a suitable container.

The cleaning composition of Formula 1 was then placed in a storage tank in order to clean the tank. The tank contains some food soil including beer stone and this cleaning cycle is meant to remediate both situations. The system for CIP was erected such that a sight glass was positioned at the outlet of the storage tank in between the outlet of the tank into the pump and another between the pump and the CIP spray ball. Initially the operator observes that the color of the cleaner is pink-red when the cycle begins. After 10 minutes of circulation the color of the cleaner can be viewed to turn yellow indicating that the cycle is no longer at full strength and is not properly cleaning the tank. Fresh cleaning composition was added to strengthen the cleaner to full cleaning strength and the proper cleaning conditions were restored.

Example 2: Use of a Basic Cleaning Composition of the Invention to Clean Beer Brewing Equipment A cleaning composition of Formula 2 comprising:
Formula 2:
Water: 53.29% by weight
MAYOQUEST 1400 1.1% by weight
Caustic Soda (50% solution) 45% by weight
Sodium gluconate 0.6% by weight
Thymol Blue: 3.4% by weight
was prepared by mixing of the ingredients in a suitable container.

The cleaning composition of Formula 2 was then used to clean beer draught lines by recirculating Formula 2 through the draft lines for about 15 minutes at a velocity of up to two gallons per minute. After circulating the composition of Formula 2 through the beer draught lines, the lines are further rinsed with water. The composition of Formula 2 may be filtered and recycled for additional use if the dye indicator in the composition indicates that the pH of the composition remains basic and that the composition remains viable to function as a caustic cleaner when the beer draft lines are cleaned again in approximately 2 weeks.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. It should also be understood that the embodiments described herein are not mutually exclusive and that features from the various embodiments may be combined in whole or in part in accordance with the invention.

What is claimed is:

1. A method for maintaining acidic or basic cleaning conditions in a cleaning-in-place (CIP) system used to clean food or beverage processing equipment comprising the steps of:
   i) adding an acidic or basic cleaning composition with a food equipment-safe colorimetric pH indicator to a storage tank of a CIP system wherein the pH indicator imparts a color to the composition that indicates a desired acidic or basic condition; and wherein the pH indicator provides a visual reading of pH conditions of the cleaning composition;
   ii) deploying the cleaning composition into a CIP cleaning cycle;
   iii) visualizing, without need for mechanical or chemical sensors, meters or probes, the color of the acidic or basic cleaning composition with the pH indicator in the CIP cleaning cycle wherein a change in the color of the cleaning composition indicates that the desired acidic or basic condition is no longer present; and iv) upon change in the color, adjusting the acidity or basicity of the cleaning composition to restore the desired acidic or basic condition.

2. The method of claim 1, wherein acidity or basicity is adjusted by adding food-equipment-safe acid or base to the storage tank or cleaning cycle or replenishing the cycle with fresh cleaning composition.

3. The method of claim 1, wherein the food-equipment-safe colorimetric pH indicator is thymol blue, methyl orange, methyl red, bromothymol blue, phenolphtalien, indigo carmine or alizarin yellow.

4. The method of claim 1, wherein the desired basic condition comprises a pH of more than about 12.

5. The method of claim 1, wherein the desired acidic condition comprises a pH of less than about 2.

6. The method of claim 1, wherein the food or beverage processing equipment is beer brewing processing equipment.

7. The method of claim 1, for maintaining acidic cleaning conditions in a cleaning-in-place (CIP) system used to clean food or beverage processing equipment wherein an acidic cleaning composition comprising a food equipment safe pH indicator is added to the storage tank of a CIP system wherein the pH indicator imparts a color that is red to the composition that indicates the desired acidic condition is present.

8. The method of claim 1, wherein prior to deploying the cleaning composition into the CIP cleaning cycle the method further comprises the steps of visualizing, without the need for mechanical or chemical sensors, meters or probes, the color of the acidic or basic cleaning composition with a pH indicator in the storage tank wherein a change in the color of the cleaning composition indicates that the desired acidic or basic condition is no longer present; and wherein upon change in the color, adjusting the acidity or basicity of the cleaning composition in the storage tank to restore the desired acidic or basic condition.

\* \* \* \* \*